(12) United States Patent
Zhao et al.

(10) Patent No.: US 10,848,025 B2
(45) Date of Patent: Nov. 24, 2020

(54) PERMANENT MAGNET BRUSHLESS MOTOR HAVING HIGH WINDING FACTOR, AND DESIGN AND FAULT-TOLERANT CONTROL METHODS THEREOF

(71) Applicant: JIANGSU UNIVERSITY, Jiangsu (CN)

(72) Inventors: Wenxiang Zhao, Jiangsu (CN); Tao Tao, Jiangsu (CN); Jihong Zhu, Beijing (CN); Jinghua Ji, Jiangsu (CN); Deshui Hu, Jiangsu (CN)

(73) Assignee: JIANGSU UNIVERSITY

( * ) Notice: Subject to any disclaimer, the term of this patent is extended or adjusted under 35 U.S.C. 154(b) by 102 days.

(21) Appl. No.: 15/782,003

(22) PCT Filed: Nov. 29, 2016

(86) PCT No.: PCT/CN2016/107620
§ 371 (c)(1),
(2) Date: Jun. 6, 2018

(87) PCT Pub. No.: WO2018/068369
PCT Pub. Date: Apr. 19, 2018

(65) Prior Publication Data
US 2019/0229573 A1    Jul. 25, 2019

(30) Foreign Application Priority Data
Oct. 10, 2016 (CN) .......................... 2016 1 0884807

(51) Int. Cl.
*H02K 3/28* (2006.01)
*H02P 27/06* (2006.01)
(Continued)

(52) U.S. Cl.
CPC ............... *H02K 3/28* (2013.01); *H02K 1/278* (2013.01); *H02K 19/10* (2013.01); *H02K 21/16* (2013.01);
(Continued)

(58) Field of Classification Search
CPC .... H02K 11/33; H02K 21/24; H01L 2924/00; Y10T 29/49009
See application file for complete search history.

(56) References Cited

U.S. PATENT DOCUMENTS

| 5,828,154 A * | 10/1998 | Bahn ..................... H02K 19/103 310/168 |
| 5,969,454 A * | 10/1999 | Pengov ................ H02K 19/103 310/162 |

(Continued)

FOREIGN PATENT DOCUMENTS

| CN | 201113736 | 9/2008 | ............. H02K 29/00 |
| CN | 103187846 | 7/2013 | ................ H02K 1/14 |
| CN | 105811818 | 7/2016 | ................ H02K 6/28 |

OTHER PUBLICATIONS

Dwivedi et al., "Performance Comparison of Different Topologies of PMBLAC motor Using FEM," 2014 IEEE International Conference on Power Electronics, Drives and Energy Systems (PEDES), Dec. 31, 2014 (6 ps).
(Continued)

*Primary Examiner* — Shawki S Ismail
*Assistant Examiner* — Zoheb S Imtiaz
(74) *Attorney, Agent, or Firm* — Hayes Soloway PC

(57) ABSTRACT

A permanent magnet brushless motor has a stator, an armature winding, a rotor, and a permanent magnet. The stator is provided with an armature groove. The armature winding is placed in the armature groove. The stator and the rotor are spaced apart by an air gap; the permanent magnet is attached to the surface of the rotor, and is magnetized by a Halbach
(Continued)

array structure. The motor is an eight-phase motor, and phases are evenly distributed at a phase belt angle of 45°. The motor and the proposed control algorithm have good fault-tolerant effects, and the average torque after fault tolerance is basically consistent with that in normal operation.

10 Claims, 7 Drawing Sheets

(51) Int. Cl.
  *H02K 19/10* (2006.01)
  *H02K 21/16* (2006.01)
  *H02P 25/092* (2016.01)
  *H02P 6/08* (2016.01)
  *H02K 1/27* (2006.01)

(52) U.S. Cl.
  CPC .............. *H02P 6/08* (2013.01); *H02P 25/092* (2016.02); *H02P 27/06* (2013.01)

(56) References Cited

U.S. PATENT DOCUMENTS

| | | | | |
|---|---|---|---|---|
| 2006/0201736 | A1* | 9/2006 | Fardoun | B62D 5/0496 180/446 |
| 2013/0119790 | A1* | 5/2013 | Gan | H02K 1/276 310/50 |
| 2014/0201979 | A1* | 7/2014 | Yamaguchi | H02K 15/066 29/596 |
| 2016/0079903 | A1 | 3/2016 | Hsu | H02P 25/085 |
| 2016/0126794 | A1* | 5/2016 | Gery | H02K 21/12 310/60 R |
| 2016/0156253 | A1* | 6/2016 | Owen | B60L 3/003 310/68 B |
| 2016/0254715 | A1* | 9/2016 | Li | H02K 11/21 310/68 B |
| 2017/0110953 | A1* | 4/2017 | Lin | H02K 37/04 |
| 2018/0358846 | A1* | 12/2018 | Baba | C22C 38/005 |

OTHER PUBLICATIONS

International Search Report (w/translation) and Written Opinion (no translation) issued in application No. PCT/CN2016/107620, dated Jul. 14, 2017 (10 pgs).

Wu, F., "Research on a Semi-12-Phase Fault-Tolerant Permanent Magnet Synchronous Machine Used for Electric Vehicles," (with English abstract only), Dissertation for the Master Degree in Engineering, Apr. 15, 2014 (81 pgs).

Bin-qiang et al., "Two fault tolerant strategies for four-phase permanent-magnet fault-tolerant machine," with English abstract, Control and Decision, vol. 28, No. 7, Jul. 2013 (7 pgs).

International Preliminary Report on Patentability issued in PCT/CN2016/107620 dated Apr. 16, 2019, 4 pages.

* cited by examiner

PERMANENT MAGNET BRUSHLESS MOTOR HAVING HIGH WINDING FACTOR, AND DESIGN AND FAULT-TOLERANT CONTROL METHODS THEREOF

FIELD OF TECHNOLOGY

The invention relates to a method for designing a permanent magnet brushless motor with improved winding factor, and a compensation control algorithm for the open circuited fault of the motor. It is applicable to aerospace and new energy vehicles, belonging to the field of motor manufacturing and control technology area.

BACKGROUND

The permanent magnet brushless motor has the advantages of small volume, high efficiency, high power factor, high torque and low working temperature. Conventional permanent magnet brushless motor usually adopts the distributed winding, which can weaken high order harmonic generated by the non-sinusoidal distribution of magnetic field, and reduce the amplitude of the pulse of each pole flux caused by the variation of air gap magnetic guide with reducing the loss of magnetic pole surface. It also can effectively weaken the amplitude of harmonic of electromotive force and improve the waveform of electromotive force. The disadvantage is that the fractional slot winding has rich harmonic of magnetic force. In some cases, the special harmonic of magnetic force interacting with main magnetic field may produce some disturbing force, especially the frequency of certain forces coinciding with basic frequency of the stator seat will cause resonance and the stator core vibration.

On the other hand, Multi-phase permanent magnet brushless motor is different from the common used three-phase permanent magnet brushless motor. The study shows, compared to three-phase permanent magnet brushless motor, multi-phase motors are especially suitable for low voltage and high power applications, the frequency of torque ripple is faster and the amplitude is smaller. In addition, more control degree of freedom can be used in fault tolerant control. So, it is very suitable for high reliability occasions such as new energy vehicles and aerospace.

A four-phase permanent magnet motor with two fault-tolerant control methods was introduced (Control and Decision Vol. 28 Seventh). Fault tolerant tooth structure was adopted by the four-phase permanent magnet brushless motor. Each of the stator teeth only wound a set of coils called double layer winding. This structure leads to the approaching totally isolation of magnetic circuit, heat, and physical. A phase failure can neither affect nor transmit to other phases which improving the reliability of the system. However, the fault-tolerant tooth leads to rich harmonics of anti-electromotive force, and the phase belt angle of the four phases motor is 90°, when open-circuit occurred, using the normal phase which is 90 degrees different from the fault phase to implement the compensation algorithm. In addition, the winding factor of the four-phase motor is relatively lower, usually, a higher winding factor can bring higher windings utilization and larger average torque.

Therefore, it is significant to improve the winding factor and fault tolerant control strategy of the existing four-phase permanent magnet brushless motor

CONTENT OF THE INVENTION

The purpose of the invention is to solve the shortcomings of common used four-phase machine, a design method of a four-phase fault permanent magnet brushless motor with improved winding factor and its fault tolerant control method of open-circuited are proposed.

The motor of the invention is implemented with the following technical scheme.

A permanent magnet brushless motor with improved winding factor includes stator and rotor, the air gap is between stator and rotor. The stator includes armature winding, stator iron core and armature slot. The rotor includes rotor core and permanent magnet. The stator core have armature slots, the windings are placed in it. The Permanent magnet is mounted on the outside of the rotor. Due to the phase belt angle of the proposed four-phase motor is 45°, so, the proposed four-phase machine can been seen as an special eight-phase machine.

1. The machine employed a permanent magnet rotor with magnets arranged in a Halbach array structure. The direction of magnetization is clockwise or anticlockwise. The magnetic field is the sum of the two permanent magnet arrays.

2. The Phase belt angle is 45°;

3. Double layer winding is adopted;

4. The slots per phase per pole $$q = \frac{z}{2mp} = \frac{1}{3},$$

where z is number of stator slots, p is the permanent magnet pole pair number, m is number of phase. In this place, the slot angle $$\alpha = \frac{p*360}{z} = \frac{3*360}{8} = 135°$$

The design method of the invention is as follows:

A design method of permanent magnet brushless motor with improved a high winding factor including the following steps.

1. The slot pitch angle of the invention is calculated according to the number of armature slots of the motor and permanent magnet pole pair number. In this place, the slot pitch angle is calculated form $$\alpha = \frac{360*p}{z} = \frac{360*3}{8} = 135°$$

where z is number of stator slots, p is the permanent magnet pole-pairs number.

The pole-pairs number of the proposed machine is 3, it is assumed that the first slot is in the 0° position, so, the second slot is in the 3*45°=135° position, angle of adjacent slots is 135° degree, the rest slots position can be obtained in the same way. The permanent magnet brushless motor is divided eight phase through this method which is named A, B, C, D, E, F, G, H.

2. Star chart of slots electromotive force of the proposed four-phase permanent magnet brushless motor is drawn according to the slot pitch angle.

3. Each phase can be obtained by using the star of slots, in this place, the phase belt angle is 45°. So, there are eight phase of one pole-pairs.

4. The coils diametrically opposed to each other are called a phase, namely, AE, BF, CG, DH. Each phase includes a positive terminal and a negative terminal, for example A+A−.

5. The short pitch factor of the motor can be calculated according to the winding connection method. The pitch y=1 due to the fractional concentrated winding.

$$k_y = \sin\frac{y}{\tau}90° = \sin\frac{2p}{z}90° = 0.924$$

where y is winding pitch, $$\tau = \frac{z}{2p}$$

is the pole pitch, z is number of stator slots, p is the permanent magnet pole pair number.

6. The proposed four-phase machine adopts the fractional slot concentrated winding with a slots per phase per pole $$q = \frac{1}{3}.$$

This machine can be seen as an integer slot concentrated winding with slots per phase per pole q=1 and slot pitch angle is 45°. The distribute factor can be obtained according to the formulation as following:

$$k_d = \frac{\sin q\frac{\alpha}{2}}{q\sin\frac{\alpha}{2}} = 1$$

7. The winding factor can be calculated by multiplying the distribute factor by pitch factor $$k_w = k_y k_p = 0.924$$

The following is the control method technical scheme of the invention

The fault tolerant control method for one phase open circuited was proposed with considering the characteristic of the proposed machine.

1. According to the motor characteristic, the current expression of motor under normal condition is given:

$$i_a = I_m \sin(\omega t)$$

$$i_b = I_m \sin(\omega t - pi/4)$$

$$i_c = I_m \sin(\omega t - pi/2)$$

$$i_d = I_m \sin(\omega t - 3*pi/4)$$

Where $\omega$ is angle frequency, $I_m$ is the amplitude of the phase current expression.

2. The formulation of the magnetic motive magnetic force of each phase of the proposed machine is given by:

$$MMF_a = \frac{1}{2}Ni_a \sin(\theta)$$

$$MMF_a = \frac{1}{2}Ni_b \sin(\theta - pi/4)$$

$$MMF_c = \frac{1}{2}Ni_c \sin(\theta - pi/2)$$

$$MMF_d = \frac{1}{2}Ni_d \sin(\theta - 3'pi/4)$$

Where $MMF_i$ (i=a, b, c, d) is the phase magnetic force, N is the number of turns per phase. $\theta$ is the space angle, $i_a$, $i_b$, $i_c$, $i_d$ is the sinusoidal current per phase.

3. The sum of the magnetic motive force of each phase is the rotating magnetic motive force the motor.

$$MMF = MMF_a + MMF_b + MMF_c + MMF_d = NI_m \cos(\omega t - \theta)$$

4. The principle of keeping magnetic motive force unchanged before and after failure is adopted. It is assumed that an open circuited occurred in phase A, The expression of rotating magnetic motive force needs to be adjusted, $$MMF_b' = \frac{1}{2}Ni_b' \sin(\theta - pi/4)$$

$$MMF_c' = \frac{1}{2}Ni_c' \sin(\theta - pi/2)$$

$$MMF_d' = \frac{1}{2}Ni_d' \sin(\theta - 3pi/4)$$

$$MMF_b' + MMF_c' + MMF_d' = MMF = NI_m \cos(\omega t - \theta)$$

Where $MMF_b$, $MMF_c$, $MMF_d$ is The single-phase magnetic motive force after open circuit.

5. The equation is decomposed by two equations containing three unknowns values, the unknown number is given in step 4 to re-give the three-phase sinusoidal current expression:

$$\begin{cases} \sqrt{2}\,i_b' + i_c' = 2*I_m[\sin(\omega t) - \cos(\omega t)] \\ i_c' + \sqrt{2}\,i_d' = -2*I_m[\sin(\omega t) + \cos(\omega t)] \end{cases}$$

6. According to the characteristics of the motor, keep the current of the phase perpendicular to the fault phase unchanged, adjust the phase current of the remainder two phase. In this place, phase C keeps unchanged, by using this constraint, the formulation in 5 can be solved.

The proposed invention has the following advantages:

1. Fractional slot concentrated winding is used in the invention, advantages of small volume, light weight, high efficiency, high power density, simple process structure and low cost can be obtained. In recent years, it has been widely used in the products of domestic and foreign companies due to a shorter winding terminal, this can reducing copper consumption and winding heat. At the same time, the winding process is simple and can be made by winding machine, reducing the production time of the motor, Compared with an integer slot machine, a smaller cogging torque can be obtained by the fractional slot concentrated winding, it is helpful to reduce the fluctuation and noise;

2. An improved winding factor can be obtained by the proposed motor design method. So, a higher conductor utilization and spacer factor, lead to a higher average torque;

3. The fault tolerant control method reduces the capacity of inverter and the insulation level of motor winding. The proposed control method can adjust the current of two of three normal winding to realize fault tolerant operation. While only one phase can be used in a conventional four-phase machine, this leads to a higher capacity of inverter and Improve the difficulty of insulation design:

4. The fault tolerant method is easy implement and a good performance can be obtained;

5. The average torque is consistent before and after failure;

6. Halbach array was used by the permanent magnet;

7. H-bridge inverter was used by the drive circuit which is suitable for fault tolerant operation.

DETAILED DESCRIPTION OF THE INVENTION

Figure 1:
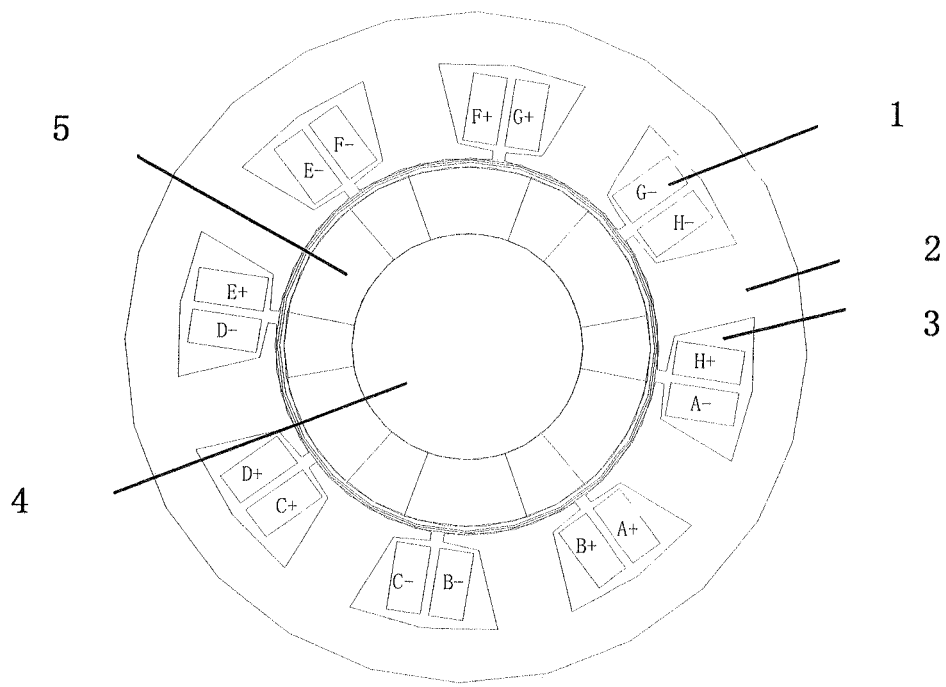
FIG. 1. Structure of the permanent magnet machine of the invention.
Figure 2:
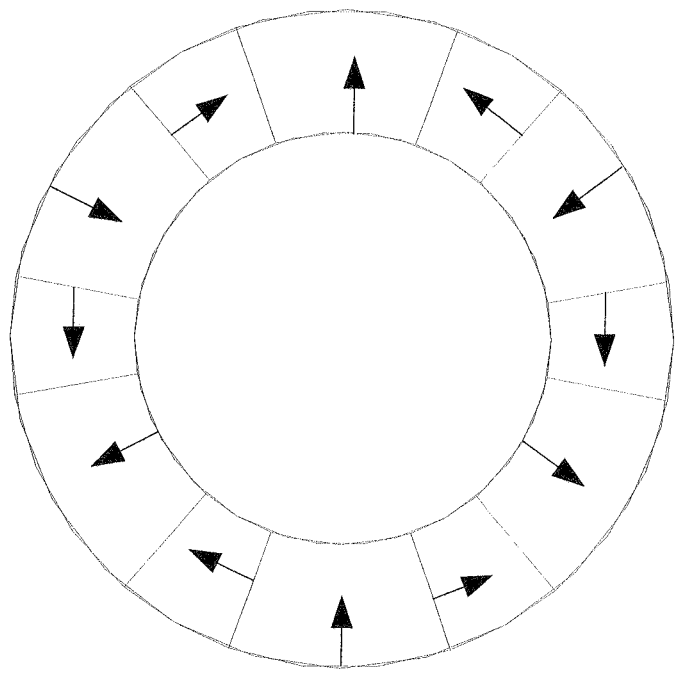
FIG. 2. Magnetization direction of the permanent magnet of the motor.
Figure 3:
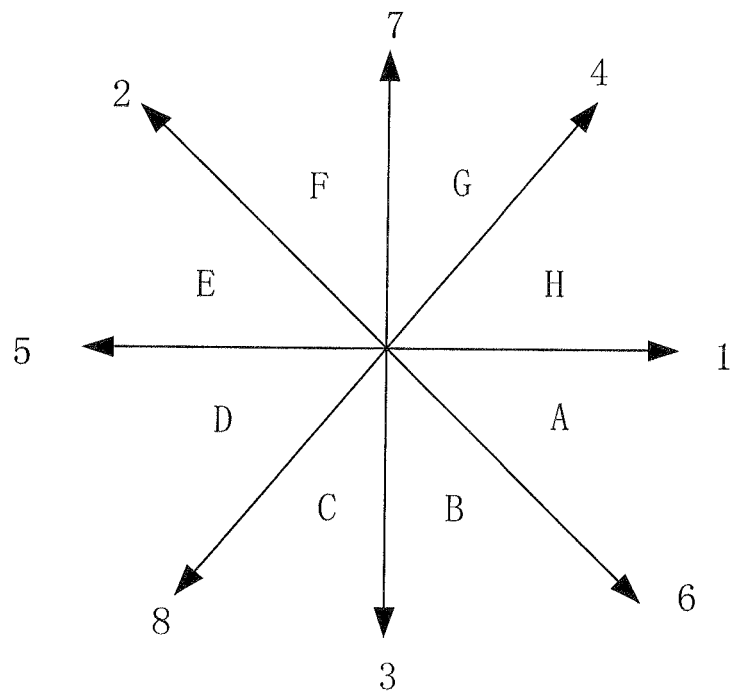
FIG. 3. Star of slots of the permanent magnet motor of the invention.

Next, the technical scheme of the proposed invention will be described by combining with drawings FIG. 1 is the basic structure of the proposed invention, there is a stator core and a rotor core, an air gap between them. The stator comprises an armature winding (1), a stator core (2) and armature slots (3). The rotor comprises rotor iron core (4) and permanent magnet (5). The armature slots (3) were engrooved in the stator core (2), the winding (1) were coiled in the slot (3), there are eight slots (3) of the proposed invention. Three pairs of permanent magnet (5) were mounted the surface of the rotor core (4). A Halbach army is used in the motor, the direction of magnetization of the permanent magnet is shown in FIG. 2. The first step of the winding design method is to calculate the slot-pitch angel and slots of per phase and per pole. Then the star of slots can be drawn as shown in FIG. 3. According to the star of slots, the motor can be divide into eight parts and the phase belt angle is 45° which named A, B, C, D, E, F, G and F. Then, there are eight terminals in FIG. 4; series connect the windings in radial direction, the terminals labeled A+, B+, C+, D+, A−, B−, C−, D−. The four phases H-bridge topology was adopted by the drive circuit of the motor due to the vector sum of the phase current is not zero.

Figure 4:
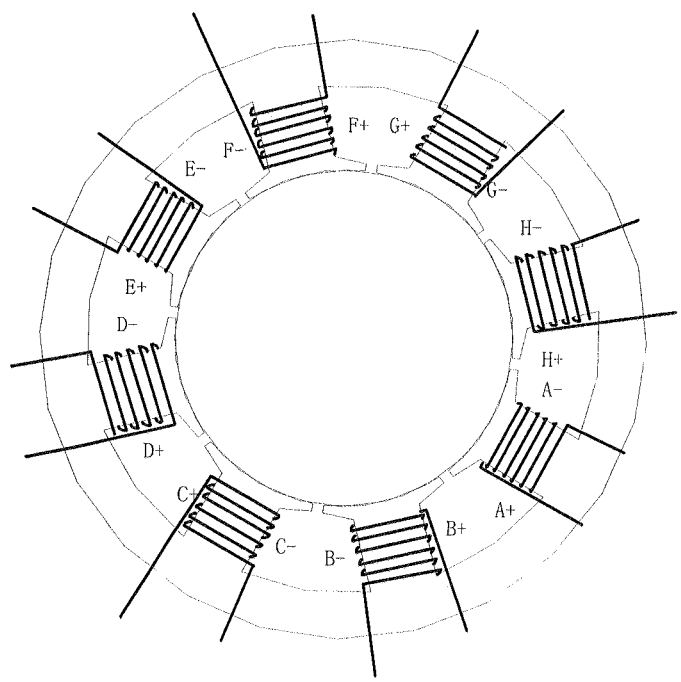
FIG. 4. Original Winding connection of the permanent magnet motor of the invention.
Figure 5:
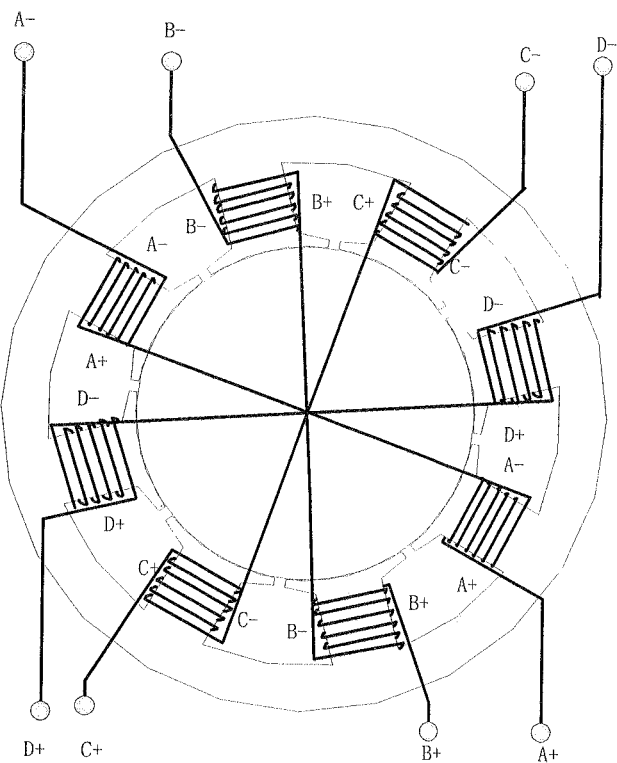
FIG. 5. Winding connection of the proposed PM machine with improved winding factor.
Figure 6:
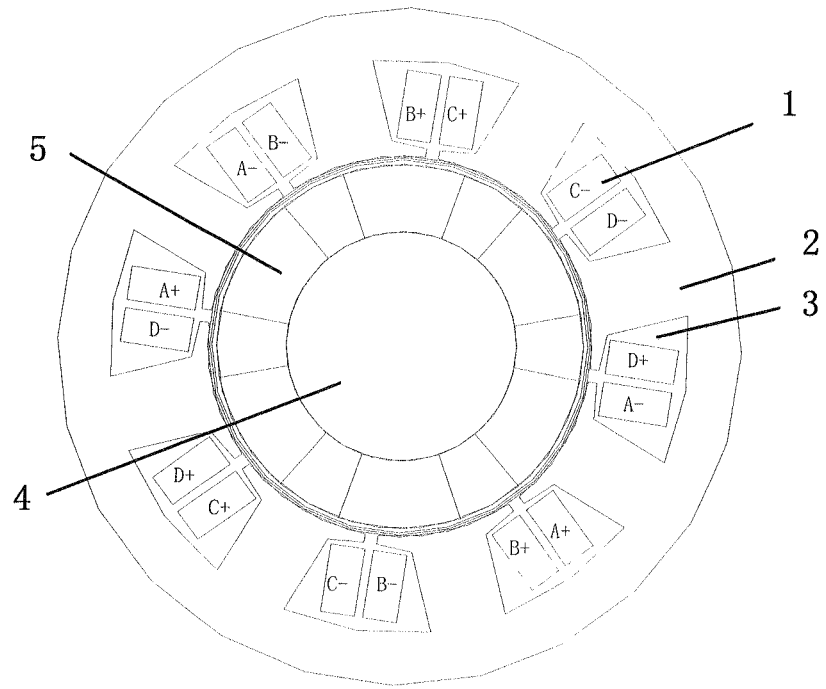
FIG. 6. Winding diagram of the equivalent half eight phase
FIG. 7. Drive circuit of the proposed control method.

The design method of the invention with a higher winding factor includes the following steps:

1. The slot-pitch angle can be calculated according to the number of slots and pole pairs. In this situation, the slot-pitch angle $$\alpha = \frac{360*p}{z} = \frac{360*3}{8} = 45°,$$

where the number of slots z equals to 8, and pole pairs of the motor is 3;

2. The position of each slot can be obtained by the star of slots. According to the calculation of slot-pitch angle, if slot 1 is in the 0 degree position, so the slot 2 is in the 45*3=135 degree. The other slots (slot 3, 4, 5, 6, 7, 8) position can be obtained by using the same method. Then, each phase can be confirmed, namely phase A, B, C, D, E, F, G, H, the phase belt angle is 45 degree. The winding connection is shown in FIG. 4;

3. The winding in radial direction connection is in series, namely AE, BF, CO, DH connect in series, after this connection, there will be A+,B+,C+,D+ is the positive terminal and A−,B−,C−,D− is the negative terminal; 4. The pitch factor can be calculated by using this winding connection, due to the concentrated winding (only a set of coils around one teeth) were adopted, the pitch y=1.

$$k_y = \sin\frac{y}{\tau}90° = \sin\frac{2p}{z}90° = 0.924$$

where y is the pitch which is the distance of the winding coil one teeth, r is the pole pitch, $$\tau = \frac{z}{2p};$$

5. The proposed fractional slot concentrated winding motor can be seen as an integral slot motor, the pitch factor can be calculated according to the formulation of integral slot motor. The winding factor can be calculated according to the results of step 4.

$$k_d = \frac{\sin q\frac{\alpha}{2}}{q\sin\frac{\alpha}{2}} = 1$$

$$k_w = k_y k_p = 0.924$$

The fault tolerant control method considering the characteristic of the proposed motor are based on the principle of keeping the magneto motive force unchanged. The expression of the magnetic motive force of the proposed motor is obtained according to the current expression under normal operation. Then, assuming an open circuited occurred in one phase, the current of fault phase becomes to be 0, the expression of the magnetic motive force under open circuited can be obtained. The fault tolerant current can be calculated by keeping the magnetic motive force unchanged before and after open circuited happened.

Implementation 1

The motor in the invention is a permanent magnet brushless motor with fractional slot concentrated winding, surface mount structure was adopted by the permanent magnet, and Halbach arrays are used. There are eight armature slots, a double layer winding is used, two coils of different phases were placed in a slot. The pole pair is 3. According to the definition, the slots of per phase per pole q=z/2mp=1/3, where z the is number of stator slots, p is the pole pair number, m is the number of phase, the slot angle α=p*360/z=3360/8=135° it is assumed that the first slot is in the 0° position, so, the second slot is in the 3*45°=135° position, the angle of adjacent slots is 135°, the position of the rest slots can be confirmed through the same way. In this method, through the permanent magnet brushless motor is divided into eight phases, namely A, B, C, D, E, F, G, and H. Then, AE, BF, CG, and DH will be connected in series, there will be four positive terminal, and four positive terminal. If the negative terminal are connected together, the proposed motor can be seen as a half-eight phase motor according to the theory of multi-phase motor.

Implementation 2

The formulation of winding factor introduced in the textbook is about the integer winding. In order to calculate the winding factor of the proposed machine, it is necessary to transform the fractional slot concentrated winding into an integer winding.

The proposed 8-slots/6-pole fractional slot permanent magnet motor (the proposed 8-slots/6-pole motor is an unit motor which the greatest common divisor of slots and pole pairs is 1) can be seen as an integer slot permanent magnet motor according to the method introduced in <<Permanent magnet brushless DC motor technology>>, which the slot distance angle is $$\alpha' = \frac{\alpha}{p} = \frac{135}{3} = 45°,$$

slots per phase per pole q'=q*p=1. Pitch y=1 for the concentrated winding, so, the pole pitch $$\tau = \frac{z}{2p} = \frac{4}{3}.$$

The calculate formula of wind factor for fractional slot concentrated winding can be deduce from the integral slot motor introduced in textbook. The pitch factor can be written as:

$$k_d = \frac{\sin\frac{q\alpha}{2}}{q\sin\frac{\alpha}{2}} = \frac{\sin\frac{q\alpha}{2}}{q\sin\frac{\alpha}{2}} = 1$$

Where: q is slots per phase per pole, a is slot distance angle.
The distribute factor can be written as:

$$k_p = \sin\frac{y}{\tau}90° = \sin\frac{2p}{z}90° = 0.924$$

Where y is pitch, τ is pole pitch, z is the number of slot, p is the pole pair.
The winding factor can be written as:

$$k_w = k_d k_p = 0.924$$

According to the calculating formulation, it is easy to conclude, an improved pitch factor of 1 (usually less than 1 for common used four phase machine) can be obtained by the proposed four-phase machine which can lead to a higher winding factor.

Implementation 3

The derivation process of the current expression involved in the proposed fault tolerant control will be given in detailed.

The current expression under normal operation is given by:

$$I_a = I_m \sin(\omega x)$$

$$I_b = I_m \sin(\omega t - pi/4)$$

$$i_c = I_m \sin(\omega t - pi/2)$$

$$i_d = I_m \sin(\omega t - 3pi/4)$$

Where ω is angle frequency, $I_m$ is the amplitude of the phase current expression.

$$MMF_a = \frac{1}{2} Ni_a \sin(\theta)$$

$$MMF_b = \frac{1}{2} Ni_b \sin(\theta - pi/4)$$

$$MMF_c = \frac{1}{2} Ni_c \sin(\theta - pi/2)$$

$$MMF_d = \frac{1}{2} Ni_d \sin(\theta - 3*pi/4)$$

The sum of the MMF of each phase can be expressed by:

$$MMF = MMF_a + MMF_b + MMF_c + MMF_d = NI_m \cos(\omega t - \theta)$$

The principle of the control method is to keep the magnetic motive force unchanged $$MMF = MMF_b' + MMF_c' + MMF_d' = NI_m \cos(\omega t - \theta)$$

Where $MMF_b'$, $MMF_c'$, $MMF_c'$ is the magnetic motive force of each phase in the case of open circuited.
This equation can be written as:

$$\frac{1}{2}Ni_b' \sin(\theta - pi/4) + \frac{1}{2}Ni_c' \sin(\theta - pi/2) + \frac{1}{2}Ni_d' \sin(\theta - 3*pi/4) =$$

$$NI_m \cos(\omega t - \theta) = Ni_b'\left[\left(\frac{\sqrt{2}}{2}\sin(\theta) - \frac{\sqrt{2}}{2}\cos(\theta)\right)\right] -$$

$$\frac{1}{2}Ni_c'\cos(\theta) + Ni_d'\left[-\frac{\sqrt{2}}{2}\sin(\theta) - \frac{\sqrt{2}}{2}\cos(\theta)\right] =$$

$$2*NI_m[\cos(\omega t)\cos(\theta) + \sin(\omega t)\sin(\theta)]$$

Where $i_b'$, $i_c'$, $i_d'$ are the sinusoidal current expressions.
A simplification of real part and imaginary part are equal and then the following are achieved:

$$\begin{cases} \left(\frac{\sqrt{2}}{2}i_b' + i_c' + \frac{\sqrt{2}}{2}i_d'\right) = -2*I_m*\sin(\omega t) \\ \left(\frac{\sqrt{2}}{2}i_b' - \frac{\sqrt{2}}{2}i_d'\right) = 2*I_m\cos(\omega t) \end{cases}$$

$$\begin{cases} \sqrt{2}\,i_b' + i_c' = 2*I_m[\sin(\omega t) - \cos(\omega t)] \\ i_c' + \sqrt{2}\,i_d' = -2*I_m[\sin(\omega t) + \cos(\omega t)] \end{cases}$$

There are infinite solutions for the equation, a constrained condition is necessary in order to obtain the unique solution.
In this way, assume an open circuited occurred in phase A, keep the current expression of phase C unchanged, adjust the current of phase B and D, the results of the formulation can be solved:

$$i_b' = 1.414 I_m \sin(\omega t) - 0.707 I_m \cos(\omega t)$$
$$= 1.581 I_m \sin(\omega t - 26.56°) = 1.581 I_m \sin(\omega t - 0.1476 pi)$$

-continued
$$I'_d = -[1.414I_m\sin(\omega t) + 0.707I_m\cos(\omega t)]$$
$$= -1.581I_m\sin(\omega t + 26.56°) = 1.581I_m\sin(\omega t + 0.1476 pi)$$

Simulation

In order to verify the feasibility of the fault tolerance control algorithm of the invention, the feasibility and effectiveness of the open fault-tolerant algorithm of the present invention will be illustrated in conjunction with the drawings in the next part. The simulation is verified by using finite element analysis software. The simulation mainly includes the current and torque waveform of the motor in the case of normal operation, single-phase open circuit and fault-tolerant control operation respectively. By comparing the torque waveforms of three different working conditions, it is proved that the fault tolerant control method is feasible.

Figure 7:
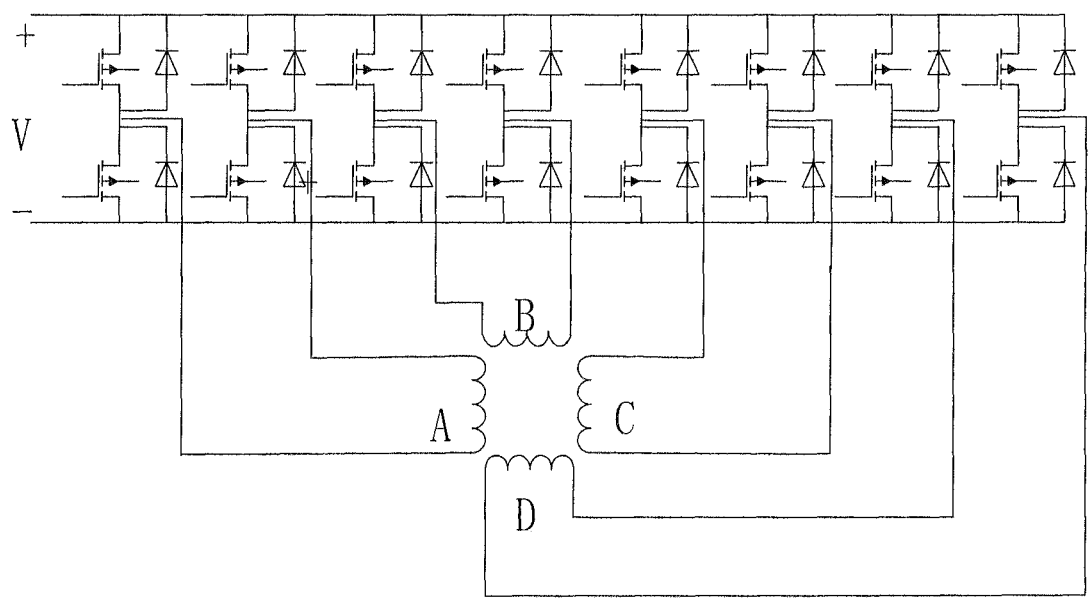
Figure 8:
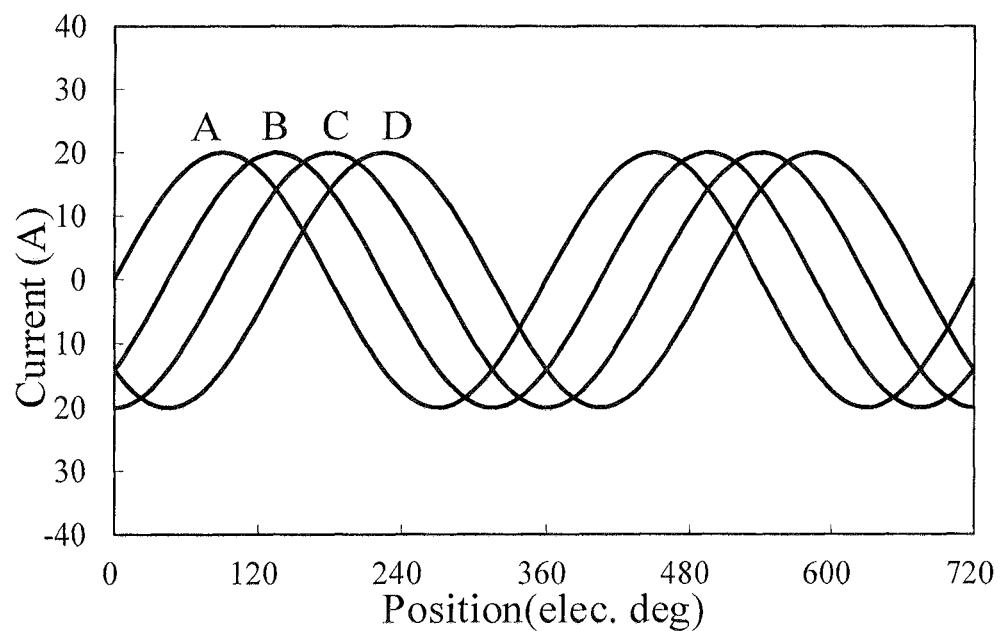
FIG. 8. Current waveforms under normal operation.
Figure 9:
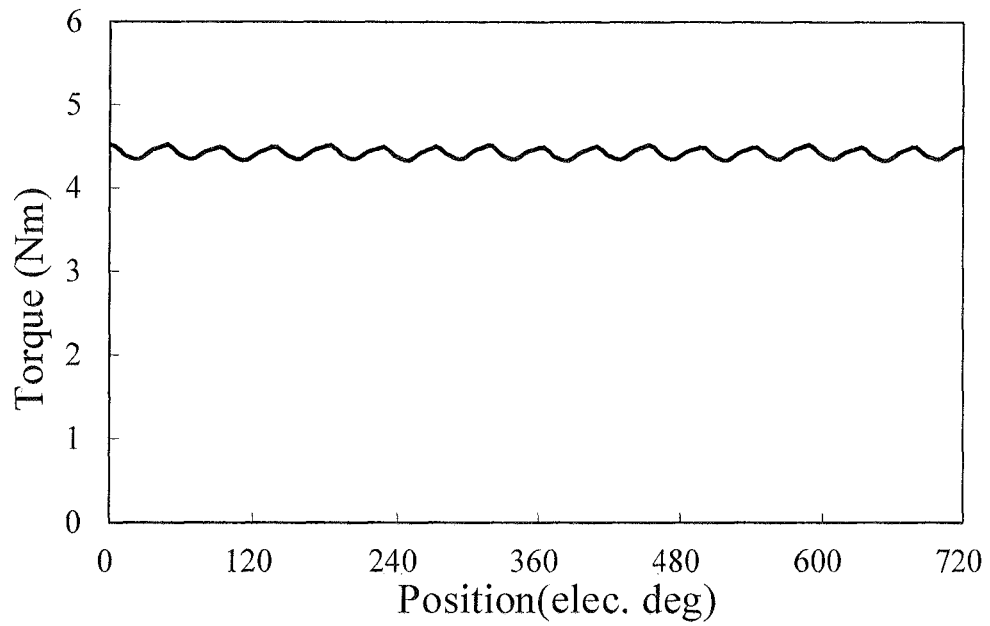
FIG. 9. Torque waveform under normal operation.

1. The current and torque waveforms in the case of normal operation can be obtained through finite element analysis by inject current expression into the motor. The current waveforms are shown in FIG. 7, torque waveform are shown in FIG. 8.

Figure 10:
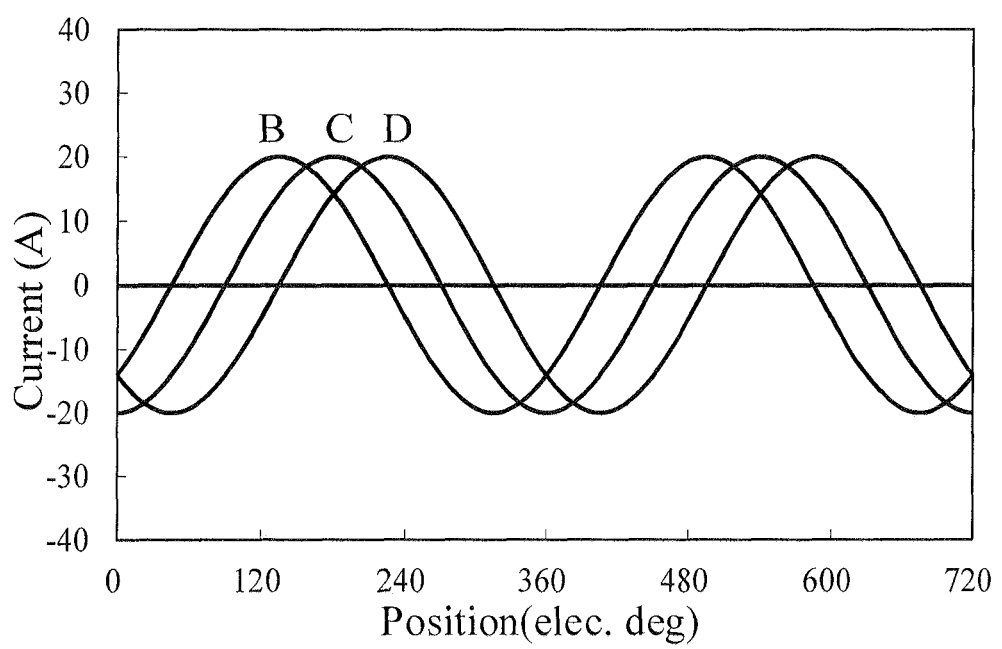
FIG. 10. Current waveforms of one phase open circuited.
Figure 11:
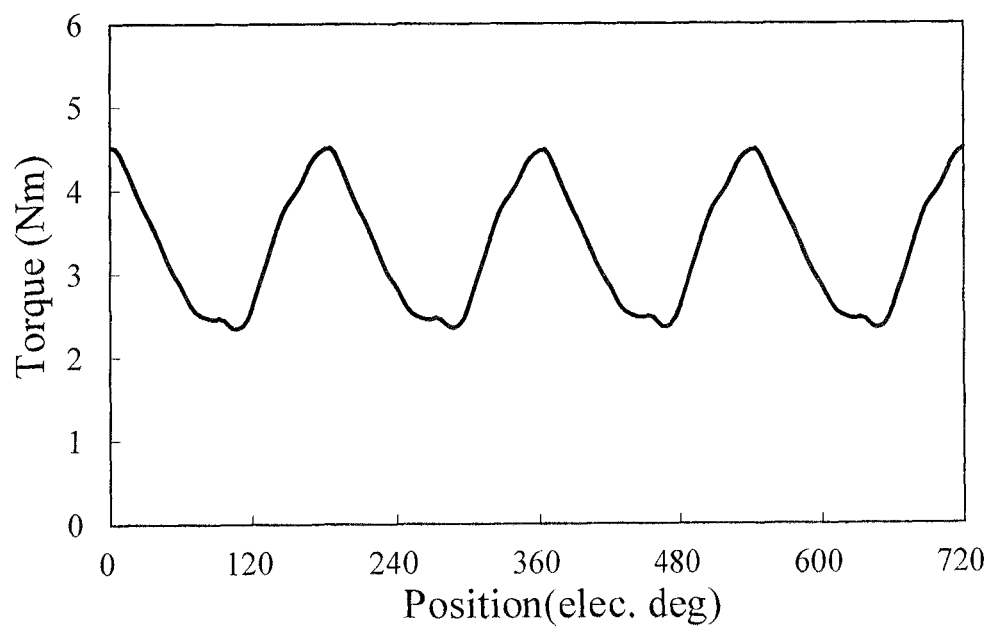
FIG. 11. Torque waveform of one phase open circuited.

2. The current and torque waveforms open-circuited can be obtained by setting one phase open (A phase assumed) in finite element analysis tool, meanwhile, the currents of other phase keep unchanged. The current waveforms are shown in FIG. 10, torque waveform are shown in FIG. 11.

Figure 12:
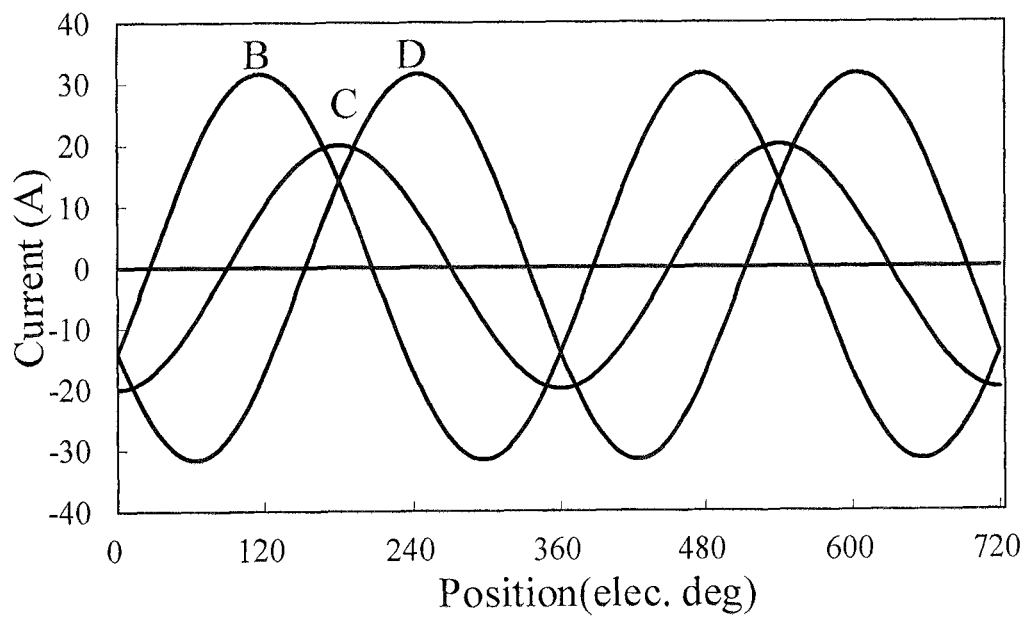
FIG. 12. Current waveforms of fault-tolerant control.
Figure 13:
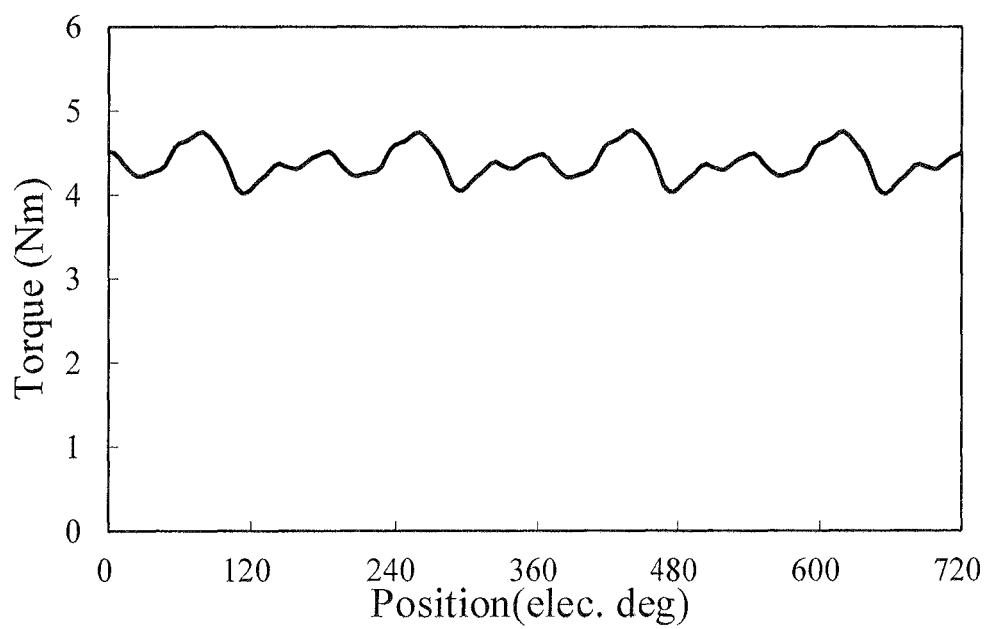
FIG. 13. Torque waveforms of fault-tolerant control.
In the figure: 1—Winding, 2—Stator core, 3—Winding slot, 4—Rotor core, 5—Permanent magnet.

3. Calculate the fault tolerant current expressions according to the principle of keeping the magnetic motive force unchanged before and after fault occurred. In the process of calculation, the current perpendicular of the fault phase must keep invariant; through the finite element analysis tool, the torque waveform can be shown in FIG. 13, the current in FIG. 12 is the fault tolerant current.

4. By comparing the torque waveforms of three conditions, it can be found, that a great performance can be obtained by adopting the proposed fault tolerant control algorithm, the average torque is the same in the case of normal condition with the torque ripple slightly increased.

In summary, the invention presents a design method about a four phase permanent magnet brushless motor with improved winding factor and the fault tolerant control method under open-circuited condition. The four phase permanent magnet brushless motor includes stator, armature winding, rotor, and permanent magnet. A double-layer winding, that is with two sets of coils per slot were adopted by the armature winding. There is an air gap between stator and rotor, Surface mount structure are used by the Permanent magnet. The machine employed a PM rotor with magnets arranged in a Halbach array. The invention introduces a design method of a four phase permanent magnet brushless motor and its fault-tolerant control strategy solves the problem of single-phase open-circuit fault. The motor structure comprises a stator, an armature winding, a rotor, and a permanent magnet. The winding slot is arranged in the stator, and an armature winding is arranged in the slot, and a double-layer winding structure is adopted. The permanent magnet are mounted on the surface of the rotor, and the permanent magnet adopts the structure of Halbach arrays. The motor of the invention is has 45 phases according to the phase of the eight phase motor with an angle of 45°. Therefore, according to the definition of the multi-phase motor, the motor of the invention can also be called a half 8 phase motor. The present invention increases the winding factor of the conventional four phase permanent magnet brushless motor, resulting in higher winding utilization and higher average torque. The fault tolerant algorithm of the invention solves the disadvantage that a common four phase motor can only utilize the phase perpendicular to the fault phase by multiplying the current expression by 2. The fault-tolerant control strategy proposed by the invention can reduce the capacity of the inverter and the insulation level of the winding. The torque performance has no change before and after the fault, A good performance can be obtained by the fault-tolerant control algorithm.

The invention claimed is:

1. A permanent magnet brushless motor with an improved winding factor, said motor including a stator and a rotor having an air gap between them;
    wherein the stator includes windings, a stator core, and a stator slot;
    the rotor includes a rotor core, and a permanent magnet;
    the windings are coiled in the stator core;
    the permanent magnets are installed on the surface of the rotor; wherein
    the permanent magnet brushless motor is an eight phase motor, and includes phase A, phase B, phase C, phase D, phase E, phase F, phase G, and phase H;
    a star chart of slots are drawn according to a phase belt angle, and the windings in a radial direction are connected in series, namely phase A and phase E, phase B and phase F, phase C and phase G, phase D and phase H; and
    four positive terminals A+, B+, C+, D+, and four negative terminals A−, B−, C−, D−; wherein:
    (a) a slot distance angle is calculated according to the stator slots and pole pairs, wherein, the angle of slots $$\alpha = \frac{p*360}{z} = \frac{3*360}{8} = 135°,$$

where z is number of stator slots:
    when a pole-pairs number of the motor is 3, and the first slot is in a 0° position, the second slot is in the 3*45°=135° position, the angle of adjacent slots is 135° degrees, a rest slots positions are obtained in the same way;
    the permanent magnet brushless motor is divided into eight phases: phase A, phase B, phase C, phase D, phase E, phase F, phase G, and phase H;
    (b) the star chart of slots of the permanent magnet brushless motor is drawn according to the slot distance angle;
    (c) each phase is arranged according to the star chart of slots, wherein the phase belt angle is 45°;
    (d) windings in a radial direction are connect in series;
    (e) a pitch factor is calculated according to a winding connect method, wherein a fractional slot concentrated winding is adopted, and a pitch factor y=1 is calculated by following formula:

$$k_y = \sin\frac{y}{\tau}90° = \sin\frac{2p}{z}90° = 0.924$$

wherein the pitch is the distance of the winding coil one teeth, τ is the pole pitch, $$\tau = \frac{z}{2p},$$

z is the stator number, p is the pole pairs:
  (f) the motor has fractional slot concentrated winding with slots per phase per pole of $$q = \frac{1}{3};$$

wherein the motor has an integer slot concentrated winding with slots per phase per pole of q=1 and a slot pitch angle of 45°;
  and a distribution factor according to the following formula:

$$k_d = \frac{\sin q \frac{\alpha}{2}}{q \sin \frac{\alpha}{2}} = 1; \text{ and}$$

(g) the winding factor is calculated by multiply the distribution factor by pitch factor according to the following formula:

$$k_w = k_y k_p = 0.924.$$

2. The permanent magnet brushless motor of claim 1, having a Halbach array structure having a direction of magnetization, wherein the direction of magnetization is clockwise or along a counter clockwise direction, and the magnetic field of the two permanent magnet arrays is superimposed to obtain a resultant magnetic field.

3. The permanent magnet brushless motor of in claim 1, having a phase belt angle of 45°.

4. The permanent magnet brushless motor of claim 1, having a double-layer winding.

5. The permanent magnet brushless motor of claim 3, having slots per phase per pole defined by the formula $$q = \frac{z}{2\,mp},$$

where z is a number of stator slots, p is the permanent magnet pole pair number, m is a number of phases; wherein $$q = \frac{z}{2\,mp} = \frac{1}{3},$$

the slot angle is $$\alpha = \frac{p*360}{z} = \frac{3*360}{8} = 135°;$$

wherein when the first slot is in the 0° position, the second slot is in the 3*45°=135°, the rest slots position can be obtained in the same way; and each angle of adjacent slots is 135° degrees.

6. The permanent magnet brushless motor of claim 1, wherein:
  (a) a current expression of the motor under normal condition is given by the formula:

$i_a = I_m \sin(\omega t)$ $i_b = I_m \sin(\omega t - pi/4)$ $i_c = I_m \sin(\omega t - pi/2)$ $i_d = I_m \sin(\omega t - 3*pi/4)$ wherein ω is angle frequency, $I_m$ is the amplitude of the phase current expression;

(b) the magnetic motive magnetic force of each phase of the motor is given by the formula:

$MMF_a = \frac{1}{2} N i_a \sin(\theta)$ $MMF_b = \frac{1}{2} N i_b \sin(\theta - pi/4)$ $MMF_c = \frac{1}{2} N i_c \sin(\theta - pi/2)$ $MMF_d = \frac{1}{2} N i_d \sin(\theta - 3*pi/4)$ wherein $MMF_i$ (i=a, b, c, d) is the phase magnetic force, N is the number of turns per phase; θ is the space angle; $i_a$, $i_b$, $i_c$, $i_d$ is the sinusoidal current per phase;

(c) the rotating magnetic motive force of the motor is given by the formula;

$MMF = MMF_a + MMF_b + MMF_c + MMF_d = NI_m \cos(\omega t - \theta)$ (d) for keeping magnetic motive force unchanged before and after failure due to an open circuited occurred in phase A, the rotating magnetic motive force is adjusted according to the following formula:

$MMF_a' = \frac{1}{2} N i_a \sin(\theta)$ $MMF_b' = \frac{1}{2} N i_b' \sin(\theta - pi/4)$ $MMF_c' = \frac{1}{2} N i_c' \sin(\theta - pi/2)$ $MMF_d' = \frac{1}{2} N i_d' \sin(\theta - 3pi/4)$ wherein $MMF_b$, $MMF_c$, $MMF_d$ is the single phase magnetic motive force after open circuit;

(e) the formula in (d) is broken down by two equations containing three un-known values, the unknown number is given in (d) to re-give the three-phase sinusoidal current expression according to the following formula:

$$\begin{cases} \sqrt{2}\,i_b' + i_c' = 2*I_m[\sin(\omega t) - \cos(\omega t)] \\ i_c' + \sqrt{2}\,i_d' = -2*I_m[\sin(\omega t) + \cos(\omega t)] \end{cases}; \text{ and}$$

(f) to keep the current of the phase perpendicular to the fault phase unchanged, adjust the phase current of the remainder two phases; wherein phase (c) is held unchanged, by using this constraint, the formula in (e) is solved.

7. A permanent magnet brushless motor with an improved winding factor, said motor including a stator and a rotor having an air gap between them;
  wherein the stator includes windings, a stator core, and a stator slot;
  the rotor includes a rotor core, and a permanent magnet;
  the windings are coiled in the stator core;
  the permanent magnets are installed on the surface of the rotor; wherein
  the permanent magnet brushless motor is an eight phase motor, and includes phase A, phase B, phase C, phase D, phase E, phase F, phase G, and phase H;
  a star chart of slots are drawn according to a phase belt angle, and the windings in a radial direction are connected in series, namely phase A and phase E, phase B and phase F, phase C and phase G, phase D and phase H; and four positive terminals A+, B+, C+, D+, and four negative terminals A−, B−, C−, D−, wherein:

(a) a current expression of the motor under normal condition is given by the formula:

$i_a = I_m \sin(\omega t)$ $i_b = I_m \sin(\omega t - pi/4)$ $i_c = I_m \sin(\omega t - p/2)$ $i_d = I_m \sin(\omega t - 3*p/4)$ wherein $\omega$ is angle frequency, $I_m$ is the amplitude of the phase current expression;

(b) the magnetic motive magnetic force of each phase of the motor is given by the formula:

$MMF_a = \tfrac{1}{2} N i_a \sin(\theta)$ $MMF_b = \tfrac{1}{2} N i_b \sin(\theta - pi/4)$ $MMF_c = \tfrac{1}{2} N i_c \sin(\theta - pi/2)$ $MMF_d = \tfrac{1}{2} N i_d \sin(\theta - 3pi/4)$ wherein $MMF_i$ (i=a, b, c, d) is the phase magnetic force, N is the number of turns per phase; $\theta$ is the space angle; $i_a$, $i_b$, $i_c$, $i_d$ is the sinusoidal current per phase;

(c) the rotating magnetic motive force of the motor is given by the formula;

$MMF = MMF_a + MMF_b + MMF_c + MMF_d = NI_m \cos(\omega t - \theta)$ (d) for keeping magnetic motive force unchanged before and after failure due to an open circuited occurred in phase A, the rotating magnetic motive force is adjusted according to the following formula:

$MMF_b' = \tfrac{1}{2} N i_b' \sin(\theta - pi/4) MMF =$ $MMF_c' = \tfrac{1}{2} N i_c' \sin(\theta - pi/2)$ $MMF_d' = \tfrac{1}{2} N i_d' \sin(\theta - 3pi/4)$ $MMF_b' + MMF_c' + MMF_d' = MMF = NI_m \cos(\omega t - \theta)$ wherein $MMF_b'$, $MMF_c'$, $MMF_d'$ is the single phase magnetic motive force after open circuit;

(e) the formula in (d) is broken down by two equations containing three un-known values, the unknown number is given in (d) to re-give the three-phase sinusoidal current expression according to the following formula:

$$\begin{cases} \sqrt{2}\, i_b' + i_c' = 2 * I_m[\sin(\omega t) - \cos(\omega t)] \\ i_c' + \sqrt{2}\, i_d' = -2 * I_m[\sin(\omega t) + \cos(\omega t)] \end{cases}; \text{ and}$$

(f) to keep the current of the phase perpendicular to the fault phase unchanged, adjust the phase current of the remainder two phases; wherein phase (c) is held unchanged, by using this constraint, the formula in (e) is solved.

8. The permanent magnet brushless motor of in claim 7, having a phase belt angle of 45°.

9. The permanent magnet brushless motor of claim 7, having a double-layer winding.

10. The permanent magnet brushless motor of claim 9, having slots per phase per pole defined by the formula $$q = \frac{z}{2mp},$$

where z is a number of stator slots, p is the permanent magnet pole pair number, m is a number of phases; wherein $$q = \frac{z}{2mp} = \frac{1}{3},$$

the slot angle is $$\alpha = \frac{p*360}{z} = \frac{3*360}{8} = 135°;$$

wherein when the first slot is in the 0° position, the second slot is in the 3*45°=135°, the rest slots position can be obtained in the same way; and each angle of adjacent slots is 135° degrees.

* * * * *